United States Patent Office 3,629,289
Patented Dec. 21, 1971

3,629,289
CHROMANAMINES
Ian Moyle Lockhart, Egham, Surrey, England, assignor to Parke, Davis & Company, Detroit, Mich.
No Drawing. Filed Apr. 24, 1969, Ser. No. 819,102
Int. Cl. C07d 7/20
U.S. Cl. 260—345.2          3 Claims

ABSTRACT OF THE DISCLOSURE

An isomer of 2-methyl-3-chromanamine, and its acid-addition salts (such as the hydrochloride, M.P. 260–261° C.), having distinctive physicochemical and pharmacological properties. The compounds are produced by reacting 2-methyl-3-nitro-2H-1-benzopyran or the appropriate isomer of 2-methyl-3-nitrochroman with an alkali metal hydride reducing agent, followed by hydrolyzing the product.

SUMMARY AND DETAILED DESCRIPTION

The present invention relates to new heterocyclic compounds. More particularly, it relates to a certain particular isomer of 2-methyl-3-chromanamine, hereinafter called the α-isomer, to acid-addition salts thereof, and to methods for the production of the foregoing compounds.

In free base form, the 2-methyl-3-chromanamidine, α-isomer, of the invention can be represented by the structural formula

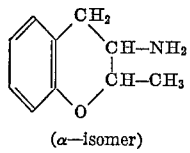

(α—isomer)

The designation "α-isomer" is arbitrarily selected and is used to mean that the amino and methyl groups have a certain relative configuration, as distinct from the opposite isomer, designated the β-isomer, in which the amino and methyl groups have a different relative configuration. In one of the isomers, the amino and methyl groups occupy a cis-configuration; whereas in the other isomer, the amino and methyl groups occupy a trans-configuration. It is not known with certainty whether the α-isomer of this invention has the cis- or trans-configuration. However, this information is not needed for the purpose of characterizing or identifying the product, because the α-isomer and β-isomer differ markedly in their physicochemical properties, for example in the melting points of their hydrochloride salts. The α-isomer of this invention can exist in racemic form as well as in the separate d- and l- forms.

In accordance with the invention, 2-methyl-3-chromanamine, α-isomer, and its acid-addition salts (also having the α-isomer configuration) can be produced by reacting a nitro compound of the formula

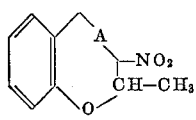

with an alkali metal hydride reducing agent, followed by hydrolyzing the product; where A is a double bond or a single bond. The nitro compound identified above as a starting material can be 2-methyl-3-nitro-2H-1-benzopyran of the formula

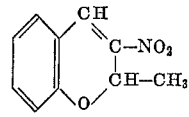

or 2-methyl-3-nitrochroman of the formula

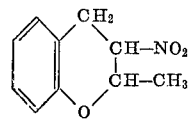

Some examples of alkali metal hydride reducing agents suitable for use as reducing agents in the process of the invention are lithium aluminum hydride and alkali metal borohydrides such as lithium borohydride and sodium borohydride. The preferred agents are lithium borohydride and lithium aluminum hydride. When lithium borohydride is used, it can be conveniently prepared in situ from potassium borohydride and lithium chloride. When using one of the preferred reducing agents, that is lithium borohydride or lithium aluminum hydride, some suitable solvents for use in the first stage of the process are diethyl ether, dibutyl ether, diethylene glycol dimethyl ether, tetrahydrofuran, 1,2-dimethoxyethane, or dioxane. When using sodium borohydride as reducing agent, a suitable solvent is an aqueous lower alkanol. The time and temperature of the reaction are not particularly critical and, in general, the reaction is carried out at from about 10 to 150° C. for from one hour to several days, depending on the reducing agent and solvent employed. Using lithium borohydride in diethylene glycol dimethyl ether or dibutyl ether, the preferred conditions are a temperature from 95 to 125° C. for 18 to 24 hours. Using lithium aluminum hydride in diethyl ether, it is preferable to mix the reactants slowly at room temperature and to heat the reaction mixtuer at reflux for approximately 5 hours. However, reaction conditions somewhat outside of these limits can also be used. In order to obtain the best yields, it is desirable to employ an excess of the reducing agent. For example, in the reduction of one mole of 2-methyl-3-nitro-2H-1-benzopyran, the recommended quantities of reducing agent are 2 to 3 moles of lithium aluminum hydride or 2 to 5 moles of lithium borohydride. The 2-methyl-3-chromanamine, α-isomer, is isolated following hydrolysis of the intermediate complex formed in the reaction. When using lithium borohydride or lithium aluminum hydride in an ethereal solvent, the hydrolysis is normally performed as a separate operation by treating the reaction mixture with water, dilute acid, or other aqueous medium. When using sodium borohydride in an aqueous lower alkanol, hydrolysis of the intermediate complex occurs in the reaction mixture and, if necessary, can be completed by the addition of dilute acid. Following hydrolysis, the 2-methyl-3-chromanamine, α-isomer, can be obtained in either free base or acid-addition salt form by adjustment of the pH.

The 2-methyl-3-nitrochroman optionally usable as a starting material in the foregoing process, can be prepared by the partial reduction of 2-methyl-3-nitro-2H-1-benzopyran with sodium borohydride in aqueous ethanol at 50° C. for 15 minutes only. The 2-methyl-3-nitro-chroman is also produced at an intermediate stage in the reduction of 2-methyl-3-nitro-2H-1-benzopyran to 2-methyl-3-chromanamine, α-isomer.

The free bases of the invention form acid-addition salts with any of a variety of inorganic and organic acids. Pharmaceutically-acceptable acid-addition salts are formed with such acids as hydrochloric, hydrobromic, sulfuric, nitric, phosphoric, acetic, citric, tartaric, succinic, benzoic, salicylic, maleic, malic, gluconic, ascorbic, and pamoic acids. The free bases and their salt forms are interconvertible by adjustment of the pH. They differ in solubility properties but in general are otherwise equivalent for the purposes of the invention.

The 2-methyl-3-chromanamine, α-isomer, of the invention and its acid-addition salts can be distinguished from 2-methyl-3-chromanamine, β-isomer, and its acid-addition salts by differences in their physicochemical properties and in their pharmacological properties. A simple and direct way of distinguishing between the α-isomer and the β-isomer is by observing the melting points of their hydrochloride salts. The 2-methyl-3-chromanamine, α-isomer, hydrochloride salt of the invention has M.P. 260–261° C. The 2-methyl-3-chromanamine, β-isomer, hydrochloride salt is a compound described by Bachman and Levine, Journal of the American Chemical Society, 70, 599–601 (1948). This compound was identified by those investigators as 2-methyl-3-aminochroman hydrochloride; M.P. 216.0–217.5° C.

The 2-methyl-3-chromanamine, α-isomer, of the invention and its acid-addition salts are useful pharmacological agents having properties distinctly different from those of 2-methyl-3-chromanamine, β-isomer, and its acid-addition salts. The compounds of the invention exhibit the behavior characteristics of antidepressant agents in a number of pharmacological assays. One of the ways in which their activity can be demonstrated is by measuring their anti-tetrabenazine effect. Tetrabenazine (otherwise known as 2 - oxo-3-isobutyl-9,10-dimethoxy-1,2,3,4,6,7-hexahydro-11bH-benzo[a]quinolizine) is capable of producing reserpine-like symptoms and depletion of brain monamines in animals. It is known that the effects of tetrabenazine, like reserpine, are antagonized by drugs with established utility as antidepressants and that tests based upon tetrabenazine antagonism are among the most useful means of evaluating antidepressant activity. The anti-tetrabenazine activity of a compound of the invention was determined by measuring the spontaneous movements of male albino rats in jiggle cages of the type described by Schulte et al., Proc. Soc. exp. Biol. N.Y. 42, 242, 1939. All animals were fasted overnight prior to use. Three treatment groups were set up. Each animal in treatment Group I received 10 mg./kg. of 2-methyl-3-chromanamine, β-isomer, subcutaneously followed 30 minutes later by 20 mg./kg. of tetrabenazine intraperitoneally. Each animal in treatment Group II was sham-dosed with saline subcutaneously; followed 30 minutes later by 20 mg./kg. of tetrabenazine intraperitoneally. Thus, treatment Group II was a control group. Each animal in treatment Group III received 10 mg./kg. of 2-methyl-3-chromanamine, α-isomer, subcutaneously; followed 30 minutes later by 20 mg./kg. of tetrabenazine intraperitoneally. The animals were then immediately placed in the jiggle cages. After a 5-minute orientation period the spontaneous activity was recorded as jiggle cage counts for a 2-hour period. The jiggle cage count values (mean number of rotations) observed were 2.00 for treatment Group I; 12.08 for treatment Group II; and 47.66 for treatment Group III. Thus, treatment with 2-methyl-3-chromanamine, α-isomer, followed by tetrabenazine, caused an increase in the spontaneous motor activity compared with rats sham-dosed with saline, followed by tetrabenazine. This anti-tetrabenazine activity as demonstrated by 2-methyl-3-chromanamine, α-isomer, is known to correlate well with the activity of antidepressant agents clinically useful in the treatment of endogenous depressions. On the other hand, treatment with 2-methyl-3-chromanamine, β-isomer, followed by tetrabenazine, caused a decrease in the spontaneous motor activity compared with rats sham-dosed with saline, followed by tetrabenazine.

The antidepressant activity of 2-methyl-3-chromanamine, α-isomer, and its acid-addition salts can also be evaluated in a number of other standard pharmacological tests in which known antidepressant agents show activity. For example, the compounds of the invention suppress the ptosis (drooping of the upper eyelid) caused by the injection of reserpine into mice. The compounds of the invention suppress the mouse-killing instinct demonstrated by those rats that consistently kill mice introduced into their cages. The compounds of the invention do not exhibit monoamine oxidase inhibiting action but like other antidepressants they inhibit the release of norepinephrine from the rat heart caused by guanethidine.

The compounds of the invention do not, to a significant degree, reduce the irritability caused in rats by destroying the septal area of the forebrain by electrocoagulation.

The invention is illustrated by the following examples.

EXAMPLE 1

A solution of 59 g. of 2-methyl-3-nitro-2H-1-benzopyran in 1.0 liter of anhydrous ether is added dropwise with stirring to a mixture of 40 g. of lithium aluminum hydride in 1.0 liter of anhydrous ether over a period of 75 minutes. The resulting mixture is stirred and heated at reflux for 5 hours. The mixture is cooled, stirred with 160 ml. of water, and allowed to stand for 16 hours. The precipitated salts are removed by filtration and the filter cake is washed several times with hot ethyl acetate. The combined filtrate and washings are extracted four times with 200 ml. portions of 2 N hydrochloric acid. The aqueous acid extracts are combined, basified with 10 N aqueous sodium hydroxide, and extracted with ether. The ether extract is dried and evaporated to give a residue of 2-methyl-3-chromanamine, α-isomer. For purification, the product is distilled in vacuo; B.P. 85–86° C. at 0.8 mm.

The hydrochloride salt of 2-methyl-3-chromanamine α-isomer, is prepared by passing dry hydrogen chloride gas into a solution of the free base in anhydrous ether and collecting the precipitated product; M.P. 260–261° C. after crystallizations from isopropyl alcohol and from aqueous ethanol. A citrate salt is prepared by adding a solution of citric acid in methanol to a solution of the free base in methanol and concentrating the mixture to a small volume. A tartrate salt is prepared in the same manner from the free base and tartaric acid.

EXAMPLE 2

A solution of lithium borohydride is prepared by adding 21.2 g. of lithium chloride to a solution of 27 g. of potassium borohydride in 100 ml. of anhydrous diethylene glycol dimethyl ether at 0.5° C., followed by stirring at 20–25° C. for 16 hours. There is then added dropwise a solution of 19.2 g. of 2-methyl-3-nitro-2H-1-benzopyran in 50 ml. of anhydrous diethylene glycol dimethyl ether, in a nitrogen atmosphere over a period of 20 minutes. The resulting mixture is stirred and heated at 105° C. for 22 hours, cooled to about 40° C., and acidified with 400 ml. of 2 N hydrochloric acid. The mixture is heated at reflux for 90 minutes and then evaporated to dryess at reduced pressure. The residue is dissolved in water and the resulting solution is basified with 10 N aqueous sodium hydroxide and extracted with ether. The ether extract is washed with water, dried, and evaporated to give a residue of 2-methyl-3-chromanamine, α-isomer. For purification, the product is distilled in vacuo; B.P. 102–104° C. at 1.8–2.0 mm.

EXAMPLE 3

With external cooling to maintain the temperature below 10° C., 21.2 g. of lithium chloride is added in portions to a stirred mixture of 27 g. of finely powdered potassium borohydride and 300 ml. of tetrahydrofuran.

The mixture is stirred for 20 hours at 20–25° C. and then filtered to remove the by-product potassium chloride. The filtrate, a solution of lithium borohydride, is evaporated to dryness at reduced pressure and the residual lithium borohydride is dissolved in 400 ml. of dibutyl ether. A stream of nitrogen gas is passed through the solution and a solution of 19.2 g. of 2-methyl-3-nitro-2H-1-benzopyran in 400 ml. of dibutyl ether is added dropwise over a period of 20 minutes. The resulting mixture is stirred and heated at 100° C. for 22 hours, then cooled to 50° C., and stirred with 100 ml. of 2 N hydrochloric acid. The organic phase is separated, extracted three times with 200 ml. portions of 2 N hydrochloric acid, washed with water, dried and evaporated to an oily residue. The aqueous acid extracts and oily residue are combined, diluted with 10 ml. of methanol, and distilled until 20 ml. of distillate is collected, thus removing residual dibutyl ether. The resulting clear acid solution is heated at reflux for 2 hours, allowed to stand at 20–25° C. for 16 hours, basified with 10 N aqueous sodium hydroxide and extracted with ether. The ether extract is washed with water, dried, and evaporated to give a residue of 2-methyl-3-chromanamine, α-isomer. For purification, the product is distilled in vacuo; B.P. 86–90° C. at 0.8 mm.

EXAMPLE 4

Over a period of one hour, 16 g. of 2-methyl-3-nitrochroman in 200 ml. of ether is added to 8.5 g. of lithium aluminum hydride in 200 ml. of ether. The mixture is heated at reflux for 4 hours, cooled, stirred with 25 ml. of water, and filtered. The residue on the filter is washed with hot ethyl acetate. The original filtrate is combined with the ethyl acetate wash, evaporated to a small volume, and extracted with 2 N hydrochloric acid. The aqueous acidic extract is basified with 10 N sodium hydroxide and extracted with ethyl acetate. The ethyl acetate phase is washed with water, dried, and evaporated to give a residue of 2-methyl-3-chromanamine, α-isomer. For purification, the product is distilled in vacuo; B.P. 79–89° C. at 0.4–0.6 mm.

The same product is obtained by reacting 2-methyl-3-nitrochroman with lithium borohydride in tetrahydrofuran for 50 hours followed by hydrolyzing the reaction mixture with 2 N hydrochloric acid and recovering the product following basification.

The starting material can be obtained as follows. With stirring at 50° C., 60 g. of sodium bicarbonate in 500 ml. of water is added to a solution of 48 g. of 2-methyl-3-nitro-2H-1-benzopyran in 500 ml. of ethanol. At 5 minute intervals, three 6 g. portions of sodium borohydride are added and stirring is continued for 5 minutes more after the last addition. Most of the ethanol is removed by distillation and the remaining mixture is diluted with 500 g. of ice and 500 ml. of water. The mixture is acidified to pH 5 with a 1:1 mixture of acetic acid and water, diluted with an additional liter of water, and extracted with two 200 ml. portions of ethyl acetate. The ethyl acetate extracts are combined, washed with water, dried, and evaporated to give a residue of 2-methyl-3-nitrochroman; M.P. 82–85° C. following crystallization from methanol.

I claim:
1. A member of the class consisting of the α-isomer of 2-methyl-3-chromanamine and acid-addition salts thereof.
2. A compound according to claim 1 which is the α-isomer of 2-methyl-3-chromanamine.
3. A compound according to claim 1 which is the α-isomer of 2-methyl-3-chromanamine hydrochloride.

References Cited

Bachman et al.: J. Amer. Chem. Soc., vol. 70, pp. 599–601 (1948).

JOHN M. FORD, Primary Examiner

U.S. Cl. X.R.

424—283